United States Patent
Siegmann et al.

(10) Patent No.: US 10,661,692 B2
(45) Date of Patent: May 26, 2020

(54) VEHICLE SEAT PUMP ASSEMBLY

(71) Applicant: Lear Corporation, Southfield, MI (US)

(72) Inventors: Jeremy Siegmann, Reutlingen (DE); Nick Schiller, Sindelfingen (DE); Alexander Schleicher, Sindelfingen (DE)

(*) Notice: Subject to any disclaimer, the term of this patent is extended or adjusted under 35 U.S.C. 154(b) by 0 days.

(21) Appl. No.: 16/194,328

(22) Filed: Nov. 17, 2018

(65) Prior Publication Data
US 2019/0184882 A1 Jun. 20, 2019

(30) Foreign Application Priority Data
Dec. 14, 2017 (DE) .................. 20 2017 107 605 U

(51) Int. Cl.
*B60N 2/90* (2018.01)
*B60N 2/70* (2006.01)
*B60Q 3/233* (2017.01)
*B60N 2/16* (2006.01)
*B60N 2/52* (2006.01)

(52) U.S. Cl.
CPC .......... *B60N 2/914* (2018.02); *B60N 2/1665* (2013.01); *B60N 2/522* (2013.01); *B60N 2/525* (2013.01); *B60N 2/7094* (2013.01); *B60Q 3/233* (2017.02); *B60N 2002/905* (2018.02)

(58) Field of Classification Search
CPC ...... B60N 2/914; B60N 2/1665; B60N 2/522; B60N 2/525; B60N 2/52
USPC .................................................... 297/452.41
See application file for complete search history.

(56) References Cited

U.S. PATENT DOCUMENTS

| | | | | |
|---|---|---|---|---|
| 3,712,603 A | * | 1/1973 | Hickinbotham | B60N 2/522 267/131 |
| 4,792,186 A | * | 12/1988 | Benjamin | A47C 7/467 297/284.6 |
| 4,954,051 A | * | 9/1990 | Smith | B60N 2/502 248/631 |
| 5,711,652 A | * | 1/1998 | Van De Venne | B29C 65/0672 415/199.1 |
| 5,967,608 A | | 10/1999 | Van Sickle | |

(Continued)

FOREIGN PATENT DOCUMENTS

CN 201101687 Y 8/2008
EP 2607157 A1 6/2013
(Continued)

*Primary Examiner* — Mark R Wendell
(74) *Attorney, Agent, or Firm* — Broks Kushman P.C.

(57) ABSTRACT

A vehicle seat assembly includes a housing seat attachment portion with hooks in receipt of suspension wires. A housing bracket extends from a housing sidewall to provide a housing cavity and a housing opening. The housing bracket is spaced above the vehicle floor by at least fifty millimeters to provide clearance between the housing bracket and the vehicle floor. A pump is received within the housing cavity adjacent to the seat attachment portion. A cover is fastened to the housing seat attachment portion and the housing bracket to at least partially enclose the housing opening and to retain the pump within the housing. A light source is received within the housing cavity and is adjacent to the seat attachment portion to minimize a height of the housing. The light source is oriented away from the seat attachment portion to illuminate a region beneath the seat bottom frame.

20 Claims, 4 Drawing Sheets

(56) References Cited

U.S. PATENT DOCUMENTS

| | | | |
|---|---|---|---|
| 8,888,193 B2 | 11/2014 | Wielgosz | |
| 2013/0343926 A1* | 12/2013 | Wykman | B60N 2/5621 |
| | | | 417/363 |
| 2016/0200230 A1* | 7/2016 | Haller | B60N 2/501 |
| | | | 296/190.08 |
| 2016/0214658 A1* | 7/2016 | Haller | B60N 2/502 |
| 2017/0370357 A1* | 12/2017 | Fitzpatrick | F04B 45/043 |

FOREIGN PATENT DOCUMENTS

| | | |
|---|---|---|
| JP | 3120848 U | 3/2006 |
| JP | 3123754 U | 7/2006 |
| JP | 2015003731 A | 1/2015 |

\* cited by examiner

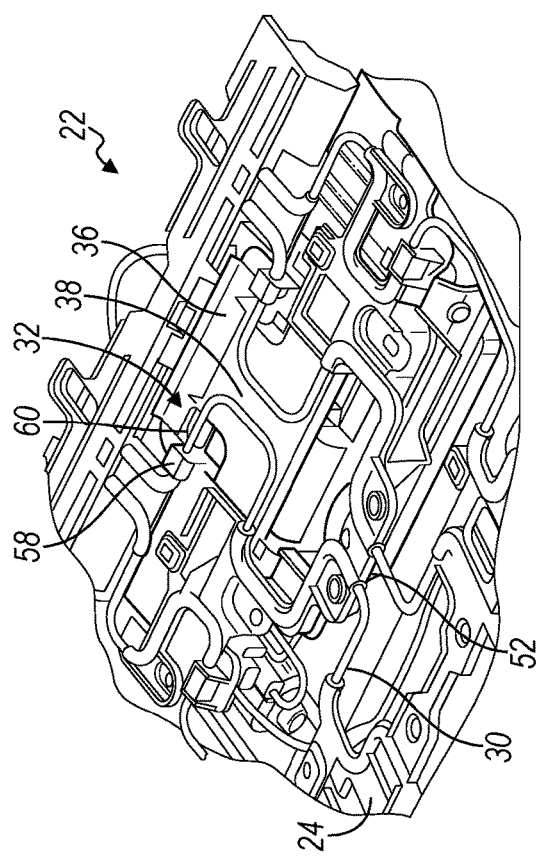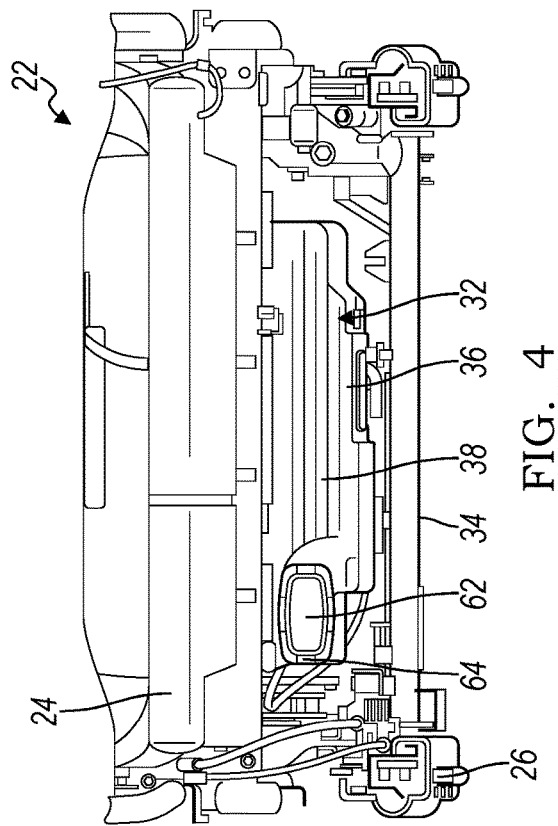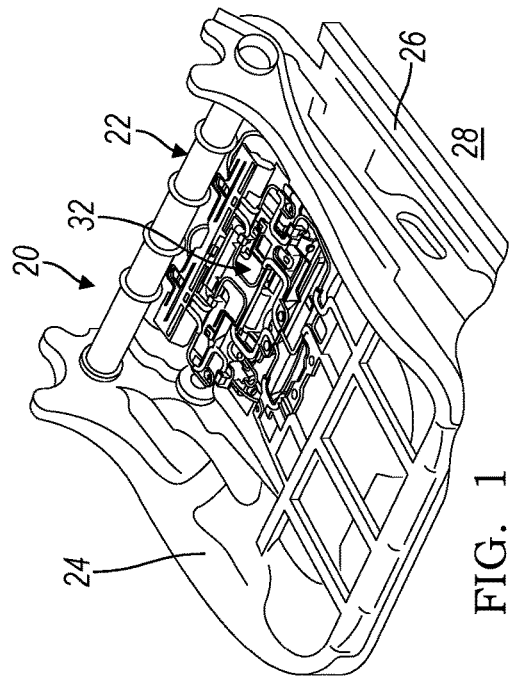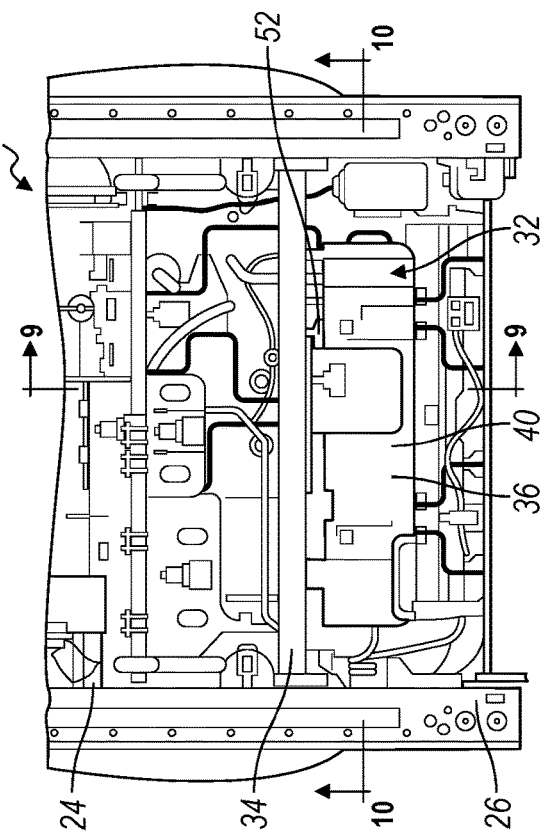

VEHICLE SEAT PUMP ASSEMBLY

This application claims the priority to DE application Serial No. 20 2017 107 605.9, filed Dec. 14, 2017, the disclosure of which is hereby incorporated in its entirety by reference herein.

TECHNICAL FIELD

Various embodiments relate to vehicle seat pump assemblies, and vehicle seat assemblies with pump subassemblies.

BACKGROUND

The prior art has provided seat assemblies with inflatable air bladders and pump assemblies for inflating the air bladders. The pump assemblies are often provided within a seat back of the seat assemblies.

SUMMARY

According to at least one embodiment, a vehicle seat pump assembly is provided with a housing, a pump received within the housing, and fasteners on the housing to fasten the housing to a seat bottom suspension.

According to a further embodiment, the fasteners include hooks sized to receive suspension wires of the seat bottom suspension.

According to an even further embodiment, the fasteners further include snaps to retain the suspension wires in the hooks.

According to another further embodiment, vibration absorbers are oriented in the housing in engagement with the pump.

According to an even further embodiment, the vibration absorbers include foam rubber.

According to another further embodiment, the housing includes a receptacle for receipt of an electrical connector.

According to an even further embodiment, an electrical connector is received in the receptacle.

According to another further embodiment, a light source is received in the housing.

According to an even further embodiment, the light source includes at least one light emitting diode.

According to another even further embodiment, the housing provides a seat attachment portion, the fasteners are provided on the seat attachment portion, and the pump and the light source are each oriented in the housing adjacent to the seat attachment portion to minimize a height of the vehicle seat pump assembly.

According to an even further embodiment, the light source is oriented away from the seat attachment portion to illuminate a region beneath an associated vehicle seat.

According to another even further embodiment, at least one tube extends from the pump to inflate at least one bladder in an associated vehicle seat, and the housing further comprises a guide to receive the at least one tube.

According to another further embodiment, the housing includes a main housing with a seat attachment portion, a sidewall extending from the seat attachment portion, and a bracket extending from the sidewall and spaced apart from the seat attachment portion to provide a cavity therebetween and an opening facing the sidewall to receive the pump within the cavity.

According to an even further embodiment, the housing includes a cover fastened to the main housing to partially enclose the opening and to retain the pump within the housing.

According to another embodiment, a vehicle seat assembly includes a seat bottom frame adapted to be mounted to a vehicle floor. A seat bottom suspension is connected to the seat bottom frame to support an occupant. A vehicle seat pump assembly is provided with a housing, a pump received within the housing, and fasteners on the housing to fasten the housing to the seat bottom suspension.

According to another embodiment, a vehicle seat assembly is provided with a seat bottom frame adapted to be mounted to a vehicle floor. A seat bottom suspension is connected to the seat bottom frame to support an occupant. A vehicle seat pump assembly is mounted to the seat bottom suspension.

According to a further embodiment, the vehicle seat pump assembly is spaced above the vehicle floor.

According to another further embodiment, the seat pump assembly includes a receptacle, and an electrical connector is received in the receptacle for electrical communication with a vehicle seat heater.

According to another further embodiment, a light source is received in the housing and oriented to illuminate the vehicle floor.

According to another embodiment, a vehicle seat assembly includes a seat bottom frame adapted to be mounted to a vehicle floor. Suspension wires are connected to the seat bottom frame to support an occupant. A housing seat attachment portion is provided with hooks in receipt of the suspension wires to support the housing. Retainers on the housing are adjacent to the hooks to retain the suspension wires within the hooks. A housing sidewall extends from the housing seat attachment portion. A housing bracket extends from the housing sidewall and is spaced apart from the housing seat attachment portion to provide a housing cavity therebetween and a housing opening facing the housing sidewall. The housing bracket is spaced above the vehicle floor by at least fifty millimeters to provide clearance between the housing bracket and the vehicle floor. Vibration absorbers are oriented within the housing cavity. A pump is received within the housing cavity in engagement with the vibration absorbers adjacent to the seat attachment portion. A cover is fastened to the housing seat attachment portion and the housing bracket to at least partially enclose the housing opening and to retain the pump within the housing. A light source is received within the housing cavity and is adjacent to the seat attachment portion to minimize a height of the housing. The light source is oriented away from the seat attachment portion to illuminate a region beneath the seat bottom frame.

BRIEF DESCRIPTION OF THE DRAWINGS

FIG. 1 is a perspective view of a vehicle seat assembly, illustrated partially disassembled, in cooperation with a seat pump assembly;

FIG. 2 is an enlarged perspective view of the seat pump assembly of FIG. 1;

FIG. 3 is a bottom plan view of the vehicle seat assembly and seat pump assembly of FIG. 1;

FIG. 4 is a rear perspective view of the vehicle seat assembly of FIG. 4;

DETAILED DESCRIPTION

Figure 6:
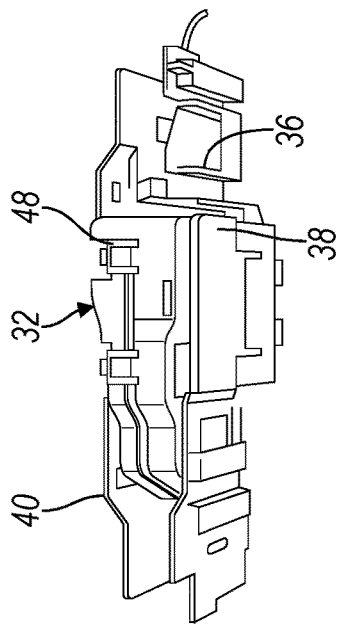
FIG. 6 is a perspective view of the seat pump assembly of FIG. 1, illustrated partially assembled.
Figure 8:
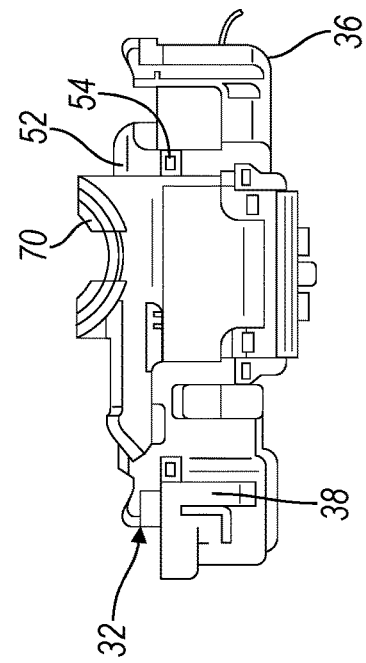
FIG. 8 is a perspective view of the seat pump assembly of FIG. 1, illustrated further assembled.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a vehicle seat assembly referenced generally by numeral 20. The seat assembly 20 may be employed in an automobile, aircraft, watercraft, or the like. Although the seat assembly 20 is illustrated and described as a vehicle seat assembly 20, the invention contemplates that the seat assembly 20 may be utilized in any other seating applications wherein a pump assembly is employed.

The seat assembly 20 includes a seat bottom 22 with a frame, also referred to as a seat cushion pan 24. The seat cushion pan 24 is supported upon a rail assembly 26, which is fastened to a vehicle floor 28. The rail assembly is also illustrated in FIGS. 2-4. The rail assembly 26 is adjustable for adjustment in a fore/aft direction, height of the seat assembly 20 relative to the vehicle floor 28, and tilt of the seat assembly 20 relative to the vehicle floor 28. Alternatively, the seat cushion pan 24 may be secured directly to the vehicle floor 28, or with brackets without any adjustment.

Referring now to FIG. 2, the seat bottom 22 includes a suspension provided by suspension wires 30 that are mounted to the seat cushion pan 24. The suspension wires 30 are formed from a rigid spring alloy to support a cushion and the occupant for providing structural support while also permitting flexibility for comfort.

The seat assembly 20 includes inflatable air bladders (not shown) for flexible adjustment of the seating position, posture, comfort and seating surface rigidity. The inflatable air bladders may be provided in various regions in the seat bottom 22 or in a seat back (not shown) extending from the seat bottom 22. The prior art has provided a pump assembly for seat assemblies with inflatable air bladders. The prior art has mounted the pump assembly within the seat back. However, the pump assembly within the seat back has limited the flexibility of the seat back by interfering with space within the seat back that would otherwise permit the occupant to rest into the seat back. Additionally, by providing the seat pump assembly in the seat back, unwanted vibrations, and noise are detectable by the occupant.

With reference now to FIGS. 1-4, the seat assembly 20 includes a pump assembly 32 that is mounted under the seat cushion pan 24. By mounting the pump assembly 32 under the seat cushion pan 24, the pump assembly 32 is out of sight, and the range of flexibility of the seat back is not inhibited. The pump assembly 32 is mounted to the suspension wire 30 to elevate the pump assembly 32 from the vehicle floor 28 to provide clearance for the feet of an occupant. This elevation provides more clearance than if the pump assembly 32 were mounted to the rail assembly 26, or if the pump assembly 32 were mounted to a cross member 34 (FIGS. 3 and 4) of the seat bottom 22.

Figure 5:
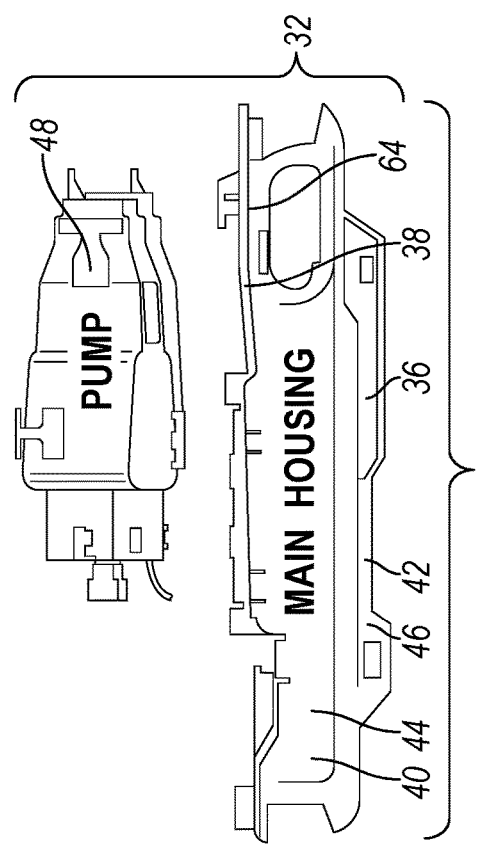
FIG. 5 is an exploded perspective view of the seat pump assembly of FIG. 1.
Figure 7:
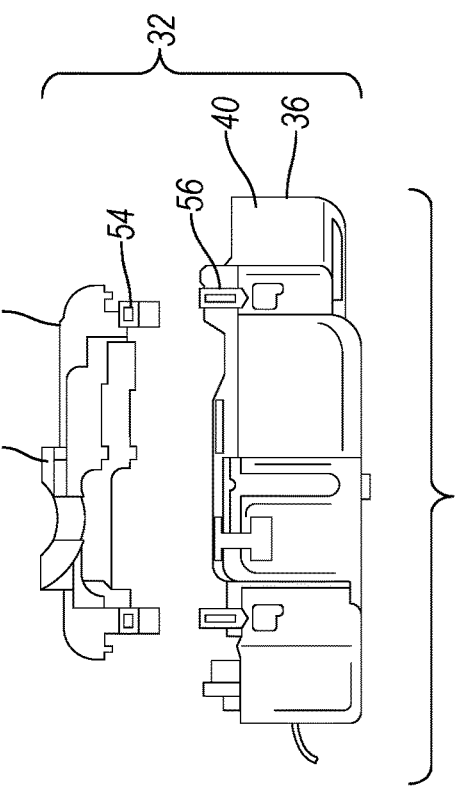
FIG. 7 is another exploded perspective view of the seat pump assembly of FIG. 1.

Referring now to FIGS. 5-9, the pump assembly 32 is illustrated in greater detail. The pump assembly 32 includes a main housing 36. The main housing 36 has three walls, which define a seat attachment portion 38, a sidewall 40 extending from the seat attachment portion 38, and a lower bracket 42 extending from the sidewall 40 and spaced apart from the seat attachment portion 38. With reference to FIG. 5, the seat attachment portion 38, the sidewall 40, and the lower bracket 42 collectively provide a cavity 44 with an opening 46.

Figure 9:
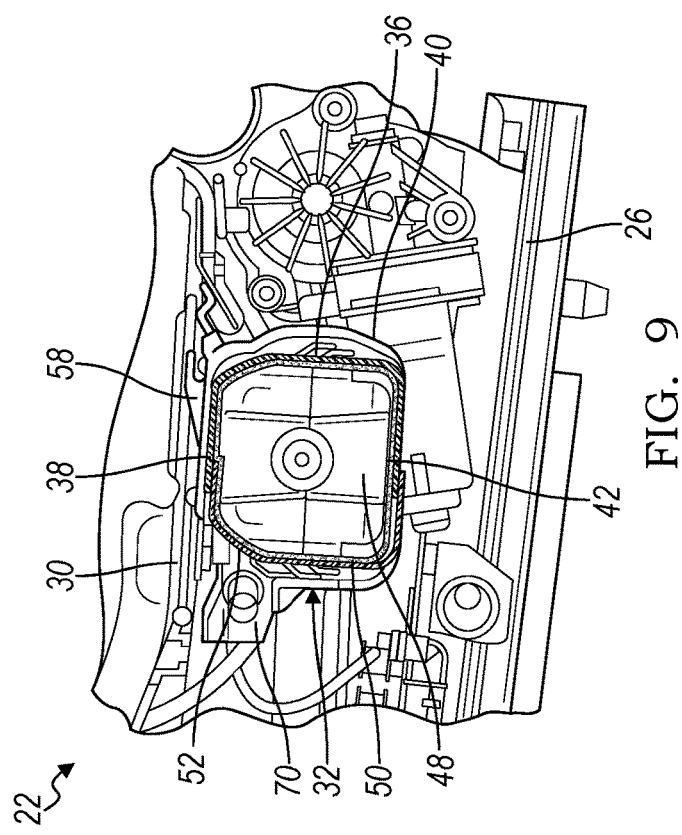
FIG. 9 is a side section view of the seat pump assembly of FIG. 1, taken along section line 9-9 in FIG. 3.

With reference now to FIGS. 5 and 6, the pump assembly 32 includes a pump 48 that is installed through the opening 46 of the main housing 36 into the cavity 44. Referring now to FIG. 9, the pump assembly 32 includes vibration absorbers 50 between the pump 48 and the main housing 36 to minimize vibrations from the pump 48 to the seat assembly 20. The vibration absorbers 50 may be foam rubber or any suitable material with damping properties.

Referring again to FIGS. 7-9, the pump assembly 32 includes a cover 52 that is secured to the main housing 36 to partially enclose the opening 46 and retain the pump 48 within the cavity 44 of the main housing 36. The vibration absorbers 50 (FIG. 9) are also provided between the pump 48 and the cover 52. The cover 52 includes a plurality of snaps or retainers 54 to engage corresponding retainers 56 on the main housing 36 to fasten the cover 52 to the main housing 36. Alternatively, the cover 52 may be omitted; and the pump 48 may be fastened to the main housing 36. According to another alternative, the cover 52 may be secured to the main housing 36 along one edge with a flexible hinge, often referred to as a living hinge.

Referring again to FIG. 2, the seat pump assembly 32 includes a plurality of fasteners on the main housing 36 to fasten the seat pump assembly 32 to the suspension wires 30. The main housing 36 includes a plurality of hooks 58 extending from the seat attachment portion 38. The hooks 58 are sized to receive the suspension wires 30. A plurality of retainers or snaps 60 are also provided on the seat attachment portion 38. The snaps 60 are oriented adjacent to hooks 58 with leading edges to permit the suspension wires 30 to pass into the hooks 58, and abutment edges to engage the suspension wires 30 and retain the suspensions wires 30 within the hooks 58.

The pump assembly 32 offers compact and protected packaging for components without having a negative influence on seat comfort. The pump assembly 32 is supported upon the suspension wires 30, and moves with the suspension wires 30 to avoid any limits upon the flexibility of the seat suspension. The pump 48 is isolated from the occupant by the vibration absorbers 50, the main housing 36 and cover 52, the suspension wires 30, and seat cushioning and trim, thereby minimizing any vibrations imparted to the occupant. The lower bracket 42 of the main housing 36 is spaced apart from the vehicle floor 28 by fifty to sixty-seven millimeters to avoid contact with the vehicle floor 28, permit airflow beneath the seat bottom 22, and to avoid contact with feet of an occupant seated to the rear of the seat assembly 20.

Figure 10:
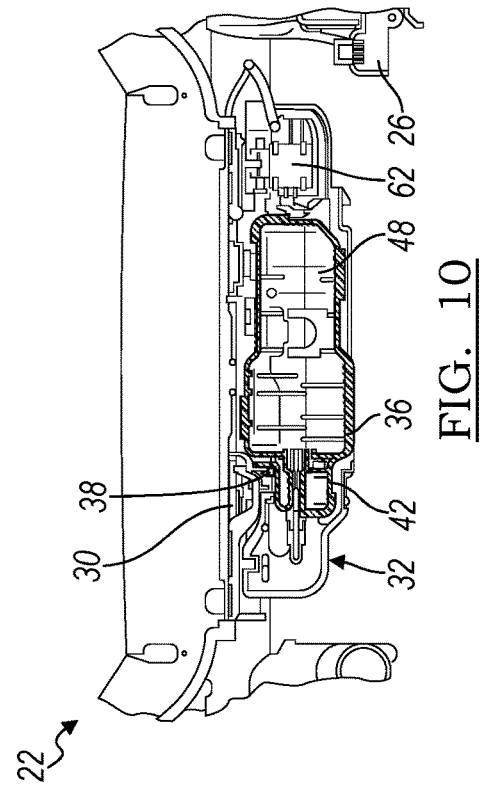
FIG. 10 is a rear section view of the seat pump assembly of FIG. 1, taken along section line 10-10 in FIG. 3.

The pump assembly 32 also offers the ability to house, support and protect other components of the seat assembly 20. Referring now to FIGS. 4 and 10, a light source, such as a light emitting diode (LED) lamp 62, is provided within the cavity 44 of the main housing 36. An aperture 64 (FIGS. 4 and 5) is formed through the sidewall 40 to permit the lamp 62 to illuminate the vehicle floor 28 below and rearward of the seat assembly 20. Referring again to FIG. 10, the lamp 62 and the pump 48 are each oriented lengthwise and adjacent to the seat attachment portion 38 of the main housing 36. By not stacking the pump 48 and the lamp 62 compactness of the pump assembly 32 is obtained.

Figure 11:
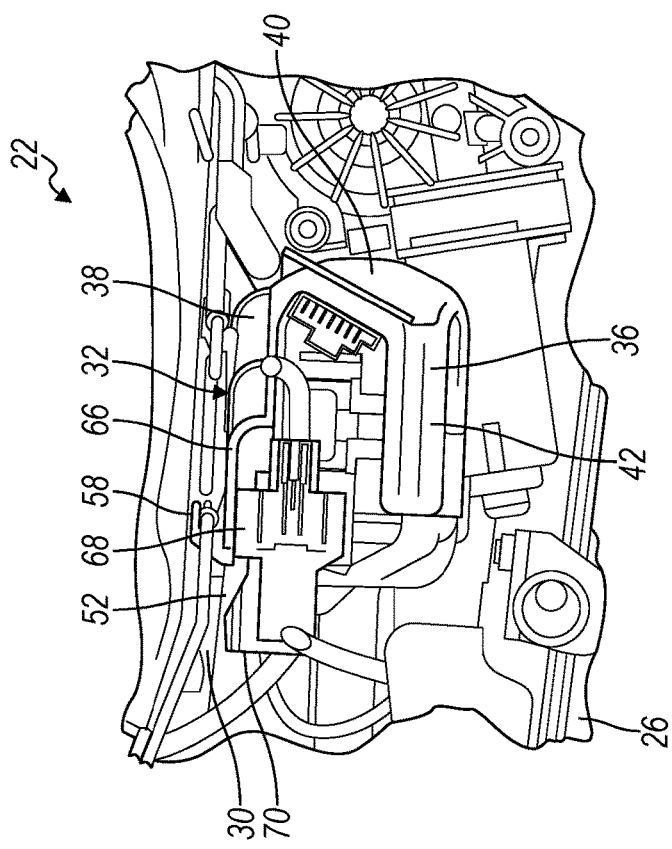
FIG. 11 is a side elevation view of the seat pump assembly of FIG. 1.
Figure 13:
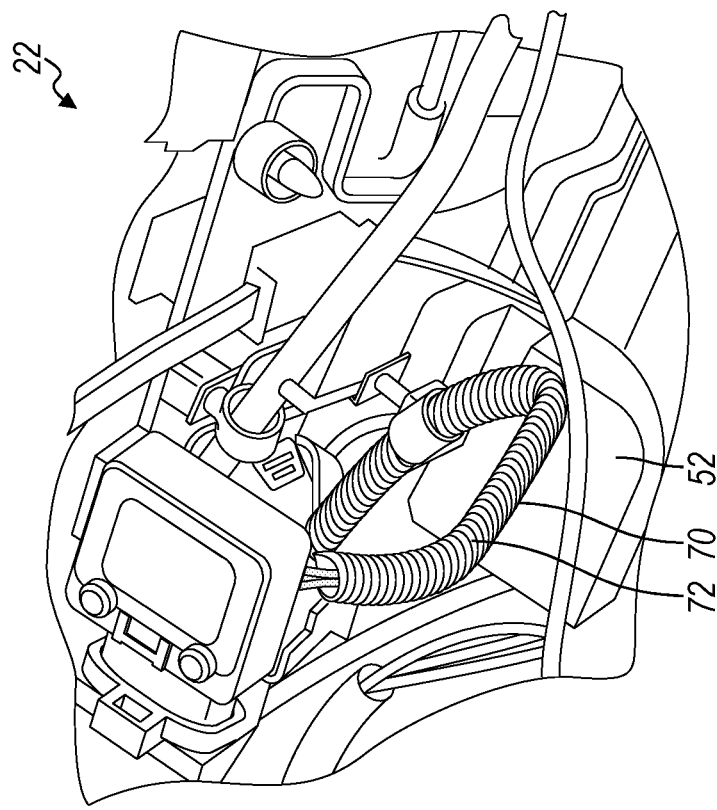
FIG. 13 is a perspective view of the seat pump assembly of FIG. 1, showing a guide/protector for a bladder hose of an occupant sensing system according to an embodiment.
Figure 12:
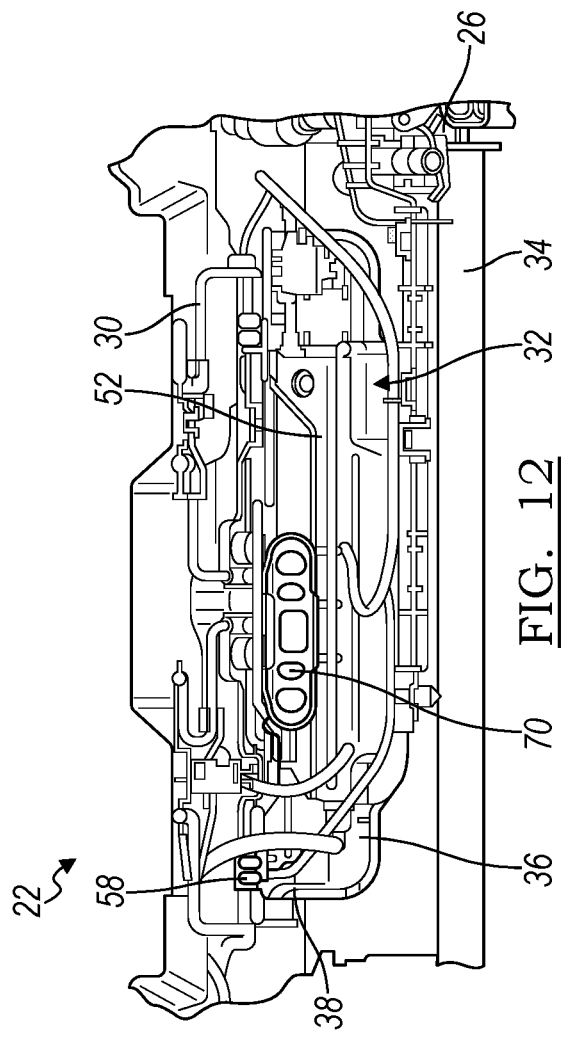
FIG. 12 is a front elevation view of the seat pump assembly of FIG. 1.

FIG. 11 illustrates a receptacle 66 provided on the main housing 36. An electrical connector such as a connector 68 for a vehicle seat heater is received in the receptacle 66. FIGS. 12 and 13 illustrate a guide 70 on the cover 52 for receipt of a bladder hose 72 of a bladder sensor mat. The resilient seat pump assembly 32 protects the internal components from outside influences, such as the car floor or the feet of a rear occupant.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat pump assembly comprising:
a housing;
a pump received within the housing;
fasteners on the housing to fasten the housing to a seat bottom suspension; and
a light source received in the housing.

2. The vehicle seat pump assembly of claim 1 wherein the fasteners comprise hooks sized to receive suspension wires of the seat bottom suspension.

3. The vehicle seat pump assembly of claim 2 wherein the fasteners further comprise snaps to retain the suspension wires in the hooks.

4. The vehicle seat pump assembly of claim 1 further comprising vibration absorbers oriented in the housing in engagement with the pump.

5. The vehicle seat pump assembly of claim 4 wherein the vibration absorbers further comprise foam rubber.

6. The vehicle seat pump assembly of claim 1 wherein the housing comprises a receptacle for receipt of an electrical connector.

7. The vehicle seat pump assembly of claim 6 further comprising an electrical connector received in the receptacle.

8. The vehicle seat pump assembly of claim 1 wherein the light source comprises at least one light emitting diode.

9. The vehicle seat pump assembly of claim 1 wherein the housing provides a seat attachment portion;
wherein the fasteners are provided on the seat attachment portion; and
wherein the pump and the light source are each oriented in the housing adjacent to the seat attachment portion to minimize a height of the vehicle seat pump assembly.

10. The vehicle seat pump assembly of claim 9 wherein the light source is oriented away from the seat attachment portion to illuminate a region beneath an associated vehicle seat.

11. The vehicle seat pump assembly of claim 9 further comprising at least one tube extending from the pump to inflate at least one bladder in an associated vehicle seat; and
wherein the housing further comprises a guide to receive the at least one tube.

12. The vehicle seat pump assembly of claim 1 wherein the housing further comprises a main housing with a seat attachment portion, a sidewall extending from the seat attachment portion, and a bracket extending from the sidewall and spaced apart from the seat attachment portion to provide a cavity therebetween and an opening facing the sidewall to receive the pump within the cavity.

13. The vehicle seat pump assembly of claim 12 wherein the housing further comprises a cover fastened to the main housing to partially enclose the opening and to retain the pump within the housing.

14. A vehicle seat assembly comprising:
a seat bottom frame adapted to be mounted to a vehicle floor;
a seat bottom suspension connected to the seat bottom frame to support an occupant; and
a vehicle seat pump assembly according to claim 1 fastened to the seat bottom suspension.

15. The vehicle seat assembly of claim 14 wherein the vehicle seat pump assembly is spaced above the vehicle floor.

16. The vehicle seat assembly of claim 14 wherein the vehicle seat pump assembly comprises a receptacle; and
wherein the vehicle seat assembly further comprises an electrical connector received in the receptacle for electrical communication with a vehicle seat heater.

17. The vehicle seat pump assembly of claim 14 wherein the light source is oriented to illuminate the vehicle floor.

18. A vehicle seat assembly comprising:
a seat bottom frame adapted to be mounted to a vehicle floor;
suspension wires connected to the seat bottom frame to support an occupant;
a housing seat attachment portion;
hooks on the housing seat attachment portion in receipt of the suspension wires;
retainers on the housing adjacent to the hooks to retain the suspension wires within the hooks;
a housing sidewall extending from the housing seat attachment portion;
a housing bracket extending from the housing sidewall and spaced apart from the housing seat attachment portion to provide a housing cavity therebetween and a housing opening facing the housing sidewall, wherein the housing bracket is spaced above the vehicle floor by at least fifty millimeters to provide clearance between the housing bracket and the vehicle floor;
vibration absorbers oriented within the housing cavity;
a pump received within the housing cavity in engagement with the vibration absorbers adjacent to the seat attachment portion;
a cover fastened to the housing seat attachment portion and the housing bracket to at least partially enclose the housing opening and to retain the pump within the housing; and
a light source received within the housing cavity and adjacent to the seat attachment portion to minimize a height of the housing, the light source being oriented away from the seat attachment portion to illuminate a region beneath the seat bottom frame.

19. A vehicle seat pump assembly comprising:
a housing;

a pump received within the housing; and fasteners on the housing to fasten the housing to a seat bottom suspension; and wherein the housing further comprises a main housing with a seat attachment portion, a sidewall extending from the seat attachment portion, and a bracket extending from the sidewall and spaced apart from the seat attachment portion to provide a cavity therebetween and an opening facing the sidewall to receive the pump within the cavity.

20. The vehicle seat pump assembly of claim 19 wherein the housing further comprises a cover fastened to the main housing to partially enclose the opening and to retain the pump within the housing.

* * * * *

UNITED STATES PATENT AND TRADEMARK OFFICE
CERTIFICATE OF CORRECTION

PATENT NO. : 10,661,692 B2
APPLICATION NO. : 16/194328
DATED : May 26, 2020
INVENTOR(S) : Jeremy Siegmann et al.

Page 1 of 1

It is certified that error appears in the above-identified patent and that said Letters Patent is hereby corrected as shown below:

On the Title Page

Item (74) Attorney, Agent, or Firm:
Delete "Broks" and insert -- Brooks --

Signed and Sealed this
Twenty-second Day of September, 2020

Andrei Iancu
*Director of the United States Patent and Trademark Office*